Aug. 6, 1929.   W. C. ESLECK   1,723,474
GLARE SHIELD AND HEADFRAME THEREFOR
Filed March 27, 1928
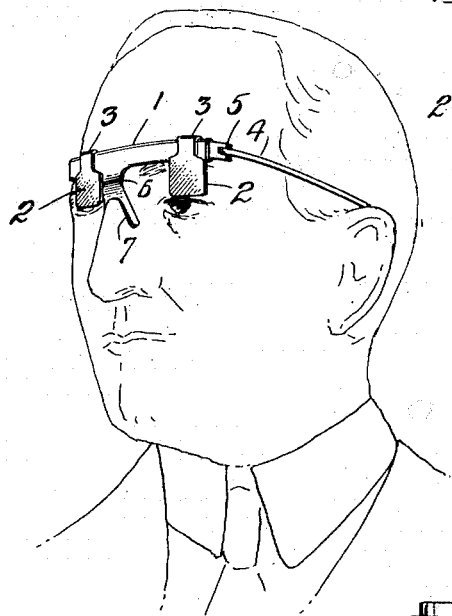
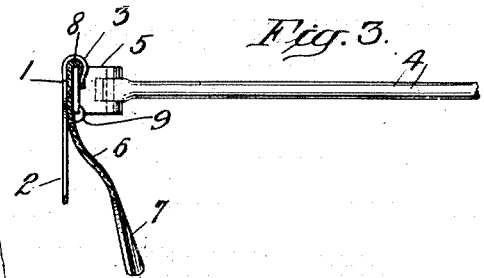
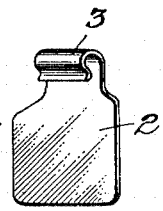
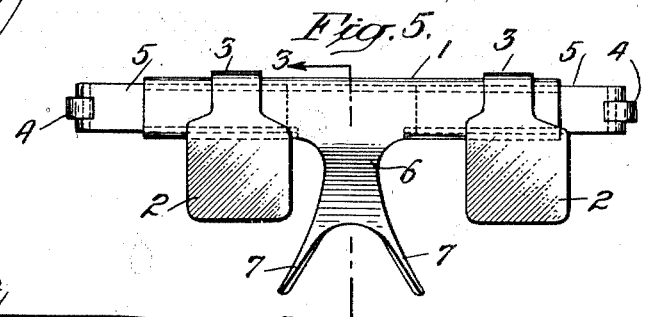
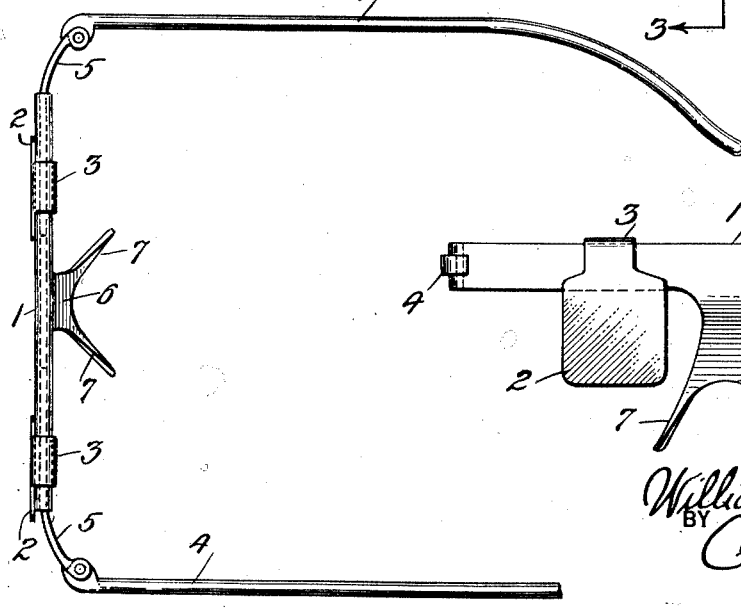
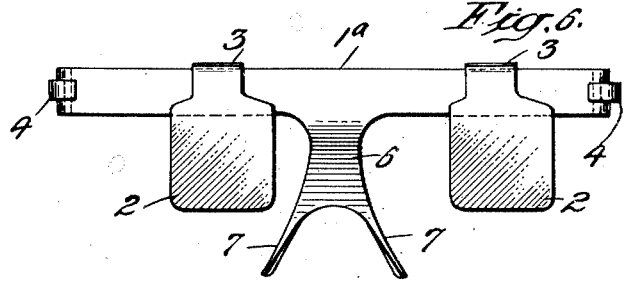
INVENTOR
William C. Esleck
BY
Fred E. Tasker.
ATTORNEY Patented Aug. 6, 1929.

1,723,474

UNITED STATES PATENT OFFICE.

WILLIAM C. ESLECK, OF SOUTHAMPTON, NEW YORK.

GLARE SHIELD AND HEADFRAME THEREFOR.

Application filed March 27, 1928. Serial No. 264,981.

My invention refers to glare shields or eye shades especially designed for attachment to a supporting means adapted to be worn on the head after the manner of eye-glasses, spectacles or the like, the shields being readily and easily positioned for use and being adjustable to suit the needs of different individuals, said shields being also adapted for combination with various forms of eyeglasses and spectacles, and the like.

The improved glare shields hereby offered have the function of protecting the eyes against the blinding glare of light from approaching headlights carried by automobiles, locomotives and trolleys, as well as from the direct light of the sun or the reflected glare of the same on sand, snow or whitened roads, while driving, or from strong light while reading, or glaring and blazing lights in other situations.

It is recognized by all who motor at night or in intense sun light that upon approaching a car fitted with powerful electric or other search lights or head lights, one is dazzled and blinded by the illumination of the approaching car to such an extent that one has great difficulty in keeping his proper position in relation to such car in the road, and in relation to the road itself, stones, stumps, trees, fences, parked cars, and the like. This presents a great and growing problem in driving on account of the enormous and increasing number of cars on the road, and the excessive volume of intense illumination at night, especially on many congested roads where the cars pass in an endless succession. The fierce glare of the head lights is blinding and injurious to the eyes of drivers and others in automobiles, and the blinding effect of the glare upon drivers has frequently been the cause of accidents. This danger still persists notwithstanding more or less general laws and rules against these excessively bright headlights, and the numerous attempts to dim the same or otherwise moderate the glare.

With the foregoing and other objects in view which will appear as the description proceeds, the invention may be said to reside in the combination and arrangement of parts, and in the details of construction hereinafter described and claimed, it being understood that changes in the precise embodiment of the invention herein described may be made within the scope of what is claimed, without departing from the spirit of the invention.

In the accompanying drawing, illustrating my invention:

Figure 1 is a front perspective view of a pair of my improved glare shields and the supporting frame therefor in operative position on the head of the user after the style of a pair of glasses or spectacles.

Figure 2 is an edge plan view of the same with the arms or bows unfolded.

Figure 3 is a cross-sectional edge view on the line 3, 3, of Figure 5.

Figure 4 is a detail perspective view of one of the glare shields.

Figure 5 is a front elevation of my improved eye shield mechanism.

Figure 6 is a similar front elevation of a modified or alternative form of the device without the extension members on the front nose frame.

Similar characters of reference denote like parts in all the different figures of the drawing.

1 denotes a front shield support consisting of a bar adapted to lie horizontally in front of the forehead at a short distance therefrom above the nose, said bar being formed with an integral nose bridge 6 to rest on the nose and provided with branching downwardly-extending prongs 7, 7, that form a bifurcation to embrace the nose on opposite sides thereof, all as clearly shown in Figure 1, said prongs 7 being suitably flexed or faced in order to neatly fit against the opposite sides of the nose without undue rubbing or irritation. Said nose bridge 6 inclines downwardly and rearwardly towards the face and below the forehead, with more or less of a curved or compoundly curved shape, as shown in Figure 3, the prongs 7, 7, preferably extending still further backward and diagonally down alongside of the nose for the desired distance, so as to insure a fit between the nose and the adjacent eye that will support the entire device on the nose in the correct position, it being noted as shown in Figure 2 that the inner edges of prongs 7 and member 6 form a curved line or a concave shape so as to make the proper bridge fit over the nose.

In Figure 4 I have shown one of the glare shields in detail. There are two of these, one for each eye. They consist of flat, thin pieces 2 of any suitable material which is opaque or translucent, as celluloid, metal, colored or smoked glass, etc., or any material that will be found practical. These shields 2 may be of any size, shape and form, and designed to shade and protect a greater or less portion of the eye. The two shields 2 are mounted in front of the eyes on the horizontal bar 1. The mode of mounting may vary, but one way is to form the shields 2 at the top with a curved bent over spring clasp 3 that fits on the edge of member 1 and grips the top horizontal edge of the same with sufficient pressure to hold the shield at any desired point with relation to the eye. Thus the shields 2 can be adjusted horizontally along on the edge of bar 1, so as to be in proper relation to each other and to the eyes.

The support 1 has two forms as shown in the drawing. One of these is extensible and can thus be made longer or shorter, as illustrated in Figures 1, 2, 3 and 5. The other is non-extensible and is shown in Figure 6. In order that the support 1 may be extensible I provide two sliding extension members 5, 5, at the ends of part 1. Guides on part 1 are provided to hold and guide these members 5, 5, and such guides may be made in many different ways, as, for example, an effective way of making the same is to form flanges on the top and bottom edges of piece 1 to receive the slides 5 between them. In Figure 3 I show the top flange 8 and the bottom flange 9, between which two flanges is the sliding part 5. These slides have arms or bows 4, 4, pivoted thereto, on shoulders at the ends, which bows are adapted to lie behind the ears and carry the glare shield mechanism in position for actual use. Thus my pair of glare shields is carried on the nose and ears. The bows may sometimes be omitted.

Referring next to Figure 6 it will be seen that the extension feature is omitted, and the support 1ª does not have any slides 5, but the bows 4 are pivoted directly to the said support 1ª. This form will be found sufficient for use in many cases, and is less cumbersome because it has fewer parts.

When the improved antiglare mechanism is placed on the head, it will assume the position substantially as shown in Figure 1. Here the shields 2 offer no obstruction to the sight in ordinary driving. When an intense and blinding illumination passes into the field of vision the driver will bend his head slightly forward, lowering the eyes slightly, and thus cause the shields 2 to shade the eyes enough to cut off the blinding glare, without shutting off the vision of road and objects to any appreciable extent.

From the foregoing it will be obvious that the entire field of vision is virtually unobstructed. The shields are used to cover only a small fraction or spot in such field, where the illumination is intense, and they leave all the rest of the roadway entirely visible, so that the sight of the road and of all objects is not interfered with, for the shields only block off these glare spots. The adjustability of the shields insures this, and the combination is such that the eyes can clearly glance out at the sides outside of the shields and all around the shields; in fact only a little of the road is cut off.

What I claim is:

1. Means for shielding the eyes from the glare of headlights and other intense illumination, consisting in the combination with a shield support consisting of a horizontal bar having an integral nose bridge member, of a pair of adjustable eye shields mounted on the upper edge of the support and provided with reversely bent spring clasps for engaging the edge of the same and permit the shields to be adjustable slidably along the edge of the bar in relation to each other and the eyes.

2. Means for shielding the eyes from the glare of headlights and other intense illumination, consisting in the combination with a shield support consisting of a horizontal bar adapted to lie in front of the forehead and formed with an integral nose bridge having prongs that project alongside of the nose, of pivoted bows at the ends of the said supporting bar that lie behind the ears, and a pair of flat adjustable eye shields mounted on the support before the eyes and having the upper ends turned over to form bent spring clasps to engage the upper edge of said support and permit said shields to be adjusted slidably along the edge of the bar in relation to each other and the eyes.

3. In a glare shield of the class described, the combination with a shield-carrying horizontal bar having a nose bridge projecting downwardly and rearwardly and bifurcated to engage the nose, of flat shields mounted on said bar and bent to engage the same, said shields being adjustably positioned in relation to the eyes to protect them against glare, and horizontal extensions on the ends of the horizontal strip, together with bows pivoted to said extensions.

4. In a glare shield of the class described, the combination with a horizontal shield support having a nose bridge, and having end sockets, of sliding extensions in the end sockets of said support, bows pivoted on the ends of said extensions and passing behind the ears, and flat glare shields having spring bent edges forming clasps to engage the edge of said support adjustably in front of the eyes.

5. In a glare shield of the class described, the combination with a front horizontal cross bar having a nose bridge and end sockets, of horizontally adjustable flat shields on the bar having reversely bent spring clasps engaging the edge of said bar in front of the eyes to protect the same against glare, extension pieces sliding in the end sockets of the horizontal bar, and bows pivoted to the said extension pieces.

In testimony whereof I hereunto affix my signature.

WILLIAM C. ESLECK.